United States Patent
Kang et al.

(10) Patent No.: US 8,139,274 B2
(45) Date of Patent: Mar. 20, 2012

(54) METHOD AND APPARATUS FOR PRINTING CONVERTED IMAGE USING PREDEFINED DATA AND COLOR CHARACTERISTICS

(75) Inventors: Byung-ho Kang, Yongin-si (KR); Heui-keun Choh, Seongnam-si (KR); Min-ki Cho, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1162 days.

(21) Appl. No.: 11/482,717

(22) Filed: Jul. 10, 2006

(65) Prior Publication Data

US 2007/0013928 A1    Jan. 18, 2007

(30) Foreign Application Priority Data

Jul. 11, 2005   (KR) .................. 10-2005-0062328

(51) Int. Cl.
| | |
|---|---|
| G03F 3/08 | (2006.01) |
| H04N 1/60 | (2006.01) |
| G06K 9/34 | (2006.01) |
| G06K 9/00 | (2006.01) |

(52) U.S. Cl. ......... 358/520; 358/1.9; 358/523; 382/166; 382/167

(58) Field of Classification Search ............ 358/1.9, 358/520, 523, 518, 530, 521, 525, 529, 1.15; 382/167, 162, 166, 163
See application file for complete search history.

(56) References Cited

U.S. PATENT DOCUMENTS

| | | | | |
|---|---|---|---|---|
| 5,317,426 A * | 5/1994 | Hoshino | ............ | 358/515 |
| 5,363,218 A | 11/1994 | Hoshino | ............ | 358/518 |
| 5,450,216 A * | 9/1995 | Kasson | ............ | 358/518 |
| 5,596,428 A * | 1/1997 | Tytgat et al. | ............ | 358/518 |
| 5,696,839 A * | 12/1997 | Siegeritz | ............ | 382/162 |
| 5,883,632 A | 3/1999 | Dillinger | ............ | 345/431 |
| 6,023,527 A * | 2/2000 | Narahara | ............ | 382/167 |
| 6,101,272 A * | 8/2000 | Noguchi | ............ | 382/167 |
| 6,437,792 B1 * | 8/2002 | Ito et al. | ............ | 345/600 |
| 6,480,299 B1 * | 11/2002 | Drakopoulos et al. | ............ | 358/1.9 |
| 6,594,388 B1 * | 7/2003 | Gindele et al. | ............ | 382/167 |
| 6,646,762 B1 | 11/2003 | Balasubramanian et al. | . | 358/1.9 |
| 7,251,058 B2 * | 7/2007 | Pop | ............ | 358/1.9 |
| 7,751,081 B2 * | 7/2010 | Huang et al. | ............ | 358/1.9 |
| 7,859,729 B2 * | 12/2010 | Ido | ............ | 358/518 |
| 2003/0001860 A1 * | 1/2003 | Yamazaki et al. | ............ | 345/590 |
| 2003/0072015 A1 * | 4/2003 | Fujino | ............ | 358/1.9 |
| 2003/0122845 A1 * | 7/2003 | Lee et al. | ............ | 345/589 |
| 2004/0042681 A1 * | 3/2004 | Takano et al. | ............ | 382/274 |
| 2004/0239928 A1 * | 12/2004 | Masuda | ............ | 356/326 |
| 2005/0078122 A1 * | 4/2005 | Ohga | ............ | 345/589 |
| 2005/0094169 A1 * | 5/2005 | Berns et al. | ............ | 358/1.9 |

(Continued)

FOREIGN PATENT DOCUMENTS

JP   2000-287096    10/2000

(Continued)

*Primary Examiner* — Madelein A Nguyen

(74) *Attorney, Agent, or Firm* — Staas & Halsey LLP

(57) ABSTRACT

A method and apparatus that outputs an optimally-converted image using predefined data and color characteristics. The method includes: receiving the color characteristics; converting the received color characteristics into a range of lightness; converting the range of lightness and the received color characteristics into a gamut of lightness and chroma to be represented by the printer; and adaptively outputting the image according to the converted range of lightness and the received color characteristics.

13 Claims, 7 Drawing Sheets

U.S. PATENT DOCUMENTS

| | | | |
|---|---|---|---|
| 2005/0128496 A1* | 6/2005 | Bala | 358/1.9 |
| 2005/0185837 A1* | 8/2005 | Takano et al. | 382/162 |
| 2006/0209325 A1* | 9/2006 | Nishikuni | 358/1.9 |
| 2007/0133017 A1* | 6/2007 | Kobayashi | 358/1.9 |

FOREIGN PATENT DOCUMENTS

| | | |
|---|---|---|
| JP | 2000-341548 | 12/2000 |
| JP | 2002-152540 | 5/2002 |

* cited by examiner

METHOD AND APPARATUS FOR PRINTING CONVERTED IMAGE USING PREDEFINED DATA AND COLOR CHARACTERISTICS

CROSS-REFERENCE TO RELATED APPLICATION

This application is based on and claims priority from Korean Patent Application No. 10-2005-0062328 filed on Jul. 11, 2005 in the Korean Intellectual Property Office, the disclosure of which is incorporated herein by reference.

BACKGROUND OF THE INVENTION

1. Field of the Invention

The present invention relates to optimal conversion of an image to be printed by a printer and, more particularly, to a method and apparatus for printing an optimally converted image using predefined data and color characteristics.

2. Description of Related Art

Image apparatuses cannot display images with all the natural colors. Therefore, image apparatuses display images by providing more information on aspects that are better recognized. Particularly, human vision is most sensitive to lightness changes. Accordingly, print quality is greatly influenced by adjusting the lightness and contrast of printed images.

U.S. Pat. No. 5,883,632 discloses a method for displaying color lightness, thereby being compressed in different directions through separate setting of a gamut, and U.S. Pat. No. 6,646,762 discloses a method for displaying color lightness using a low-pass filter. However, they do not enhance color preference, and they do not consider properties of input and output devices.

Conventionally, solid colors are optimized by remapping lightness/chroma, but there is a strong probability that detailed parts to be printed will be massed. That is, conventional printing methods optimize primary solid colors such as cyan, magenta, yellow, and secondary solid colors such as red, green and blue, and represent composite images with details. However, this is contradictory to the aspect of color mapping.

Accordingly, there is a demand for a method and an apparatus for enabling lightness/contrast adjustment that considers outputting color characteristic of various input and output devices, and input images, as well as the visual sensitivity of humans.

BRIEF SUMMARY

An aspect of the present invention provides a method and apparatus for outputting an optimally converted image using predefined data and color characteristics.

According to another aspect of the present invention, there is provided a method of outputting an optimally converted image using predefined data and color characteristics, the method including: receiving the color characteristics; converting the received color characteristics into a range of lightness; converting the range of lightness and the received color characteristics into a gamut of lightness and chroma to be represented by the printer; and adaptively outputting the image according to the converted range of lightness and the received color characteristics.

According to another aspect of the present invention, there is provided an apparatus including: an information input unit which receives color characteristics; a lightness/contrast output unit which converts the received color characteristics into a range of lightness that can be represented by a printer; a lightness/chroma output unit which converts the range of lightness and the received color characteristics into a gamut of lightnesses and chroma that can be represented by a printer; and an output unit which outputs an image corresponding to the converted result from the lightness/chroma output unit.

According to another aspect of the present invention, there is provided a computer readable recording medium storing a program for executing the aforementioned method.

Additional and/or other aspects and advantages of the present invention will be set forth in part in the description which follows and, in part, will be obvious from the description, or may be learned by practice of the invention

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Figure 1:
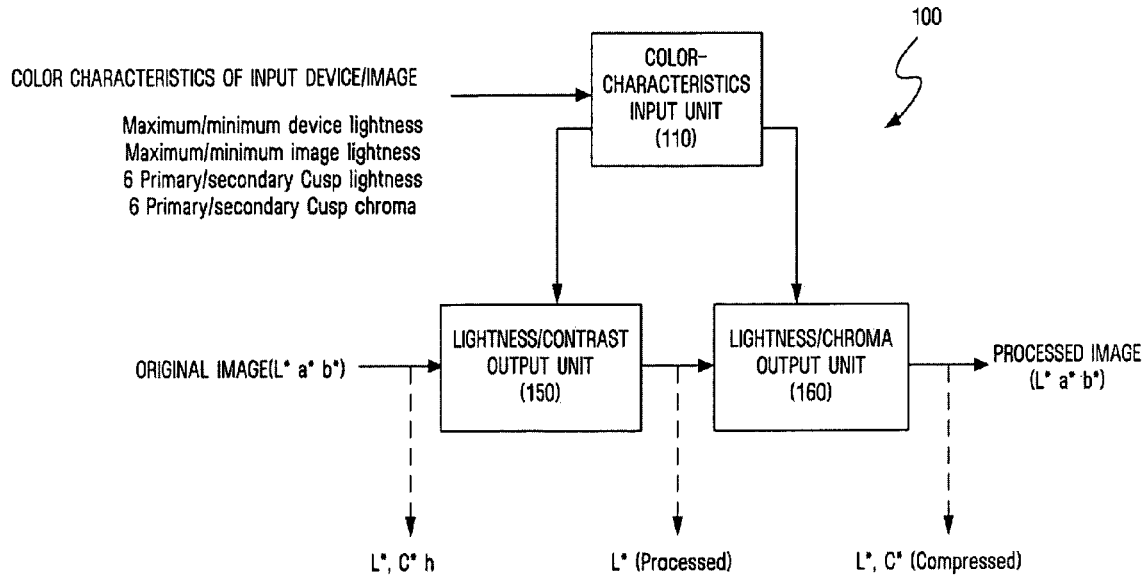
FIG. 1 illustrates optimal color conversion in a printer according to an exemplary embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

A method and apparatus for printing an optimally converted image using predefined data and color characteristics according to embodiments of the present invention will now be described more fully with reference to the accompanying drawings of block diagrams or flowcharts. It should be obvious that combinations of the each block and flow chart drawings of the processing flow charts can be executed by the computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function(s) specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur in an order that differs from that shown and/or described. For example, two blocks shown in succession may in fact be executed substantially concurrently or the blocks may sometimes be executed in reverse order, depending upon the functionality involved.

FIG. 1 illustrates optimal color conversion in a printer. The illustrated printer comprises a color-characteristics input unit 110, a lightness/contrast output unit 150, and a lightness/chroma output unit 160. An optimally-converted color can be printed by the units of the printer. An output unit means a unit which reproduces input image and output to other device or display the reproduced image or printing to a paper.

The color-characteristics input unit 110 receives color characteristics of an input device such as, by way of non-limiting examples, a digital camera, a high-definition television (HDTV), or a monitor, or of an image. The color characteristics may include maximum and minimum lightness values of an input device, or of an image. The information may also include six values of primary/secondary cusp lightness or cusp chroma. The term "cusp" is a maximum value of a given hue. The term "lightness" can be interchangeable with "brightness" or "luminance". The term "chroma" can be interchangeable with "chrominance".

The maximum value can be calculated in the lightness/contrast output unit 150 and the lightness/chroma output unit 160. Information of a gamut represented by an input device or an image can be understood through the cusp information and become basic data for optimal conversion into a gamut of a printer. The color-characteristics input unit 110 will be described in detail with reference to FIG. 2.

The lightness/contrast output unit 150 maps a lightness to a color image or input device input by the color-characteristics input unit 110. In general, the magnitude of maximum and minimum lightness values of input devices such as digital cameras, monitors, and HDTVs are large, but those of a printer are relatively small. That is, a difference in lightness to be maintained when mapping wide-range data to narrow-range data is reduced. Therefore, the lightness/contrast output unit may use an S-shaped function in order to make lightness/contrast clear in view of human visual sensitivity. The lightness/contrast output unit 150 will be described in detail with reference to FIG. 3 and FIG. 4 in the following.

The lightness/chroma output unit 160 maps lightness information (L*) and chroma information (C*) processed in the lightness/contrast output unit 150 appropriately to the gamut of a printer. At this time, in order to prevent the massing of an original color and the disappearance of details, the direction pattern can be set. The lightness/chroma output unit 160 will be described in detail below with reference to FIGS. 5, 6 and 7.

FIG. 1 illustrates color values of an original image, which are displayed in the Commission Internationale de l'Eclairage (CIE) color space of L*a*b*. In a cathode ray tube (CRT) or a scanner, R (red), G (green), and B (blue) values can be converted to the CIE color space L*a*b*. These values are converted into lightness (L*), chroma (C*) and hue (H), and input into the lightness/contrast output unit 150 and the lightness/chroma output unit 160.

Figure 2:
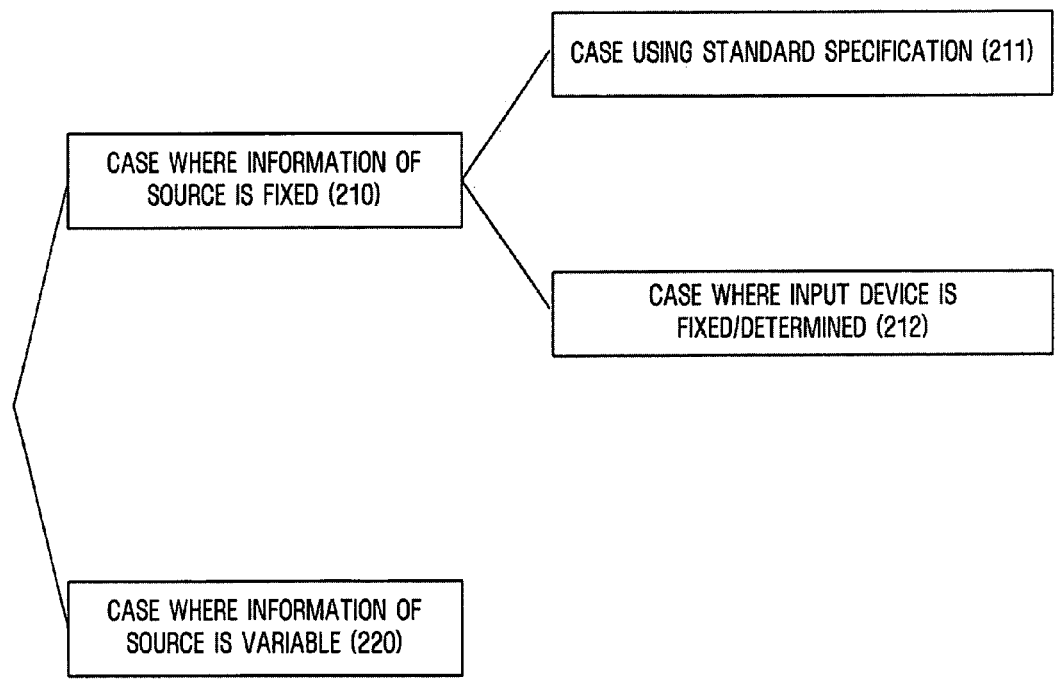
FIG. 2 illustrates the classification of a color characteristic received by a color-characteristics input unit according to an embodiment of the present invention.

FIG. 2 illustrates the classification of color characteristics received by a color-characteristics input unit according to an embodiment of the present invention. There are two cases: a case where source information to send an image is fixed 210 and a case where it is variable 220. And the case where source information to send an image is fixed is also divided into two cases: a case where the standard specification is used as denoted by the numeral 211 and a case where an input device is fixed as denoted by the numeral 212.

In the case labeled with numeral 211, standard spaces such as sRGB, scRGB, and sYCC are used. Using the standard specification, the maximum lightness ($L_{i,max}$) and the minimum lightness ($L_{i,min}$) that can be outputted can be identified. By the standard specification, maximum chroma values (C_ir_cusp, C_iy_cusp, C_ic_cusp, C_ib_cusp, C_im_cusp) and lightness values (L_ir_cusp, L_iy_cusp, L_ig_cusp, L_ic_cusp, L_ib_cusp, L_im_cusp) that can be converted to the colors: red (255, 0, 0), yellow (255, 255, 0), green (0, 255, 0), cyan (0, 255, 255), blue (0, 0, 255), and magenta (255, 0, 255) are calculated, and the calculated values can be used as variables.

These variables are input into the lightness/contrast output unit 150 and the lightness/chroma output unit 160. Values that are defined in the standard specification may be used since standard color spaces are used.

In the case denoted by the numeral 212, standard spaces are not used, but a monitor that is fixed to a printer is applied. Because characteristics of an input device are fixed, color characteristics of the monitor can be acquired through characterization equations or look-up tables (LUT). Maximum lightness ($L_{i,max}$) and minimum lightness ($L_{i,min}$) that can be outputted are identical to the case using the Standard specification. Maximum chroma values (C_ir_cusp, C_iy_cusp, C_ic_cusp, C_ib_cusp, C_im_cusp) and lightness values of (L_ir_cusp, L_iy_cusp, L_ig_cusp, L_ic_cusp, L_ib_cusp, L_im_cusp) that can be outputted to the colors: red (255, 0, 0), yellow (255, 255, 0), green (0, 255, 0), cyan (0, 255, 255), blue (0, 0, 255), and magenta (255, 0, 255) are calculated, and the calculated values can be used as variables.

These variables are input into the lightness/contrast output unit 150 and the lightness/chroma output unit 160.

In the case denoted by the numeral 220, each device cannot be set for variable sources. For example, various digital cameras can be connected with a printer. Because information for the device may not exist, color characteristics previously included in an image header can be used. For example, maximum lightness (Li,max) and minimum lightness (Li,min) that can be outputted, which are included in the input device (a digital camera, a scanner, a photocopier) capturing image, or maximum lightness (Li,max) and minimum lightness (Li,min) of pixels of a relevant image can be calculated. By the standard specification, maximum chroma values (C_ir_cusp, C_iy_cusp, C_ic_cusp, C_ib_cusp, C_im_cusp) and lightness values of (L_ir_cusp, L_iy_cusp, L_ig_cusp, L_ic_cusp, L_ib_cusp, L_im_cusp) that can be converted to the colors: red (255, 0, 0), yellow (255, 255, 0), green (0, 255, 0), cyan (0, 255, 255), blue (0, 0, 255), and magenta (255, 0, 255) are calculated from the input device that captured an image or the hue of pixels of an image, and the calculated values can be used as variables.

These variables are input into the lightness/contrast output unit 150 and the lightness/chroma output unit 160.

A color-characteristics input unit 110 can have a method for receiving the color characteristics from an input device and a method for extracting stored color characteristics. For example, storing color characteristics in an Electrically Erasable Programmable Read-Only Memory (EEPROM) and converting them using stored data, and outputting them according to a hue of a printer. When using an EEPROM, it is possible to produce a new input device through a firmware upgrade, and is possible to apply to new color characteristics to an input device.

Figure 3:
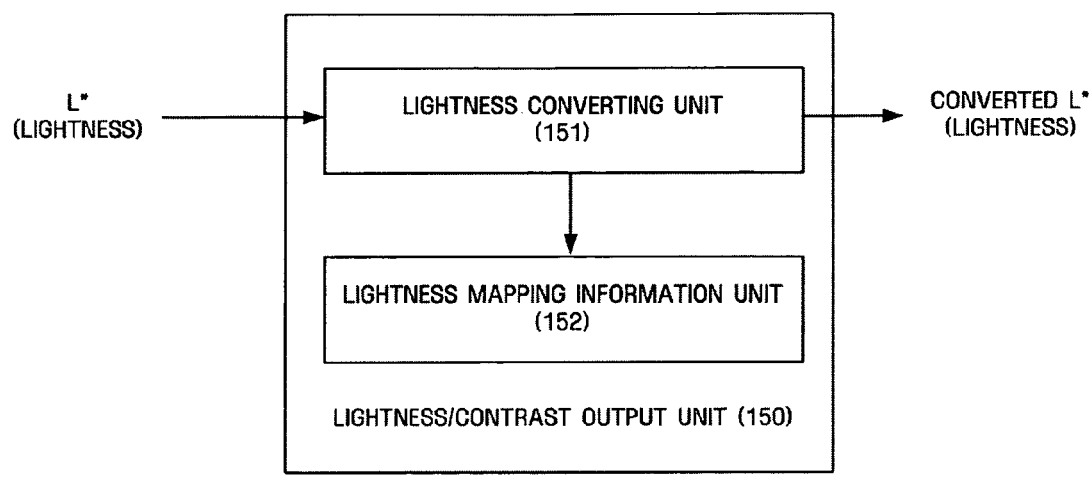
FIG. 3 illustrates the configuration of a lightness/contrast output unit according to an embodiment of the present invention.

FIG. 3 illustrates a lightness/contrast output unit 150 according to an embodiment of the present invention. The lightness/contrast output unit 150 maps a device with a large lightness range (for example, a digital camera or a monitor) to a printer with a small lightness range. The lightness/contrast output unit 150 includes a lightness-converting unit 151 and a lightness-mapping information unit 152. The lightness-converting unit 151 converts the inputted lightness (L*) to be within the range of maximum and minimum lightness of a printer. Here, the lightness-converting unit 151 uses stored information in the lightness mapping information unit 152 to accomplish the conversion.

Mapping from the device having a wide lightness range into a device having a small lightness range, thereby decreasing the lightness range, reduces the quality of the image. To prevent this, the lightness-converting unit 151 enlarges the lightness/contrast using an S-shaped function for the mapping.

The lightness-converting unit 151 needs an average and a standard deviation as determining variables of an S-shaped function. To acquire them, data can be stored in the lightness-mapping-information unit 152.

As determining variables of an S-shaped function, x0 (the average) and $\Sigma$ (the standard deviation), are decided by the first division look-up table (1D LUT), which is based on experiments. The look-up table (LUT) can be variously developed according to the performance and function of a printer, or the visual sensitivity of a user. Table 1 and Table 2 show examples of look-up tables.

TABLE 1

Average Lightness Mappings

| ($L_{imax}-L_{imin}$) | x0 |
|---|---|
| >65.0 | 55 |
| 64.4 | 50.5 |
| 61.3 | 46.5 |
| 58.1 | 42.5 |
| 55.0 | 38.75 |
| <55.0 | 30.0 |

Table 1 shows mapping to an average lightness value according to the difference between the maximum lightness ($L_{imax}$) and minimum lightness ($L_{imin}$) value of an input device or input image.

TABLE 2

Standard Deviation Mappings

| $L_{ratio}$ | $\Sigma$ |
|---|---|
| >0.97 | 37.0 |
| 0.97 | 37.0 |
| 0.93 | 35.0 |
| 0.89 | 34.0 |
| 0.85 | 33.5 |
| 0.81 | 33.0 |
| 0.77 | 31.2 |
| <0.77 | 31.2 |

Table 2 shows determination of the standard deviation by the ratio of difference between the maximum and minimum lightness of a printer, input device or input image ($L_{ratio}=L_{rmax}-L_{rmin}$).

According to the look-up tables Table 1 and Table 2, the average (x0) and standard deviation ($\Sigma$) of an S-shaped function is changed according to the color characteristics of an input/output device. A determining variable can be calculated using look-up tables such as Table 1 and Table 2, or linear interpolation. The variables x0 and $\Sigma$ may be optimal factors that are decided by an experiment, or set by the printer characteristics.

By the processing above, Sigmoidal probability variable (Si) can be calculated when selecting the determining factor. x0 is the average of the normal distribution, $\Sigma$ is the standard deviation, and m is the number of data points of the first dimension look-up table.

Equation 1 shows how to calculate the probability:

$$S_i = \sum_{n=0}^{i} -\frac{1}{\sqrt{2\pi\Sigma}} e^{\frac{(\frac{n}{m}x_o)^2}{2\Sigma^2}} (i=0, 1, 2, \ldots, m)$$

As mentioned above, information for the look-up table or the linear interpolation is stored in the ROM or EEPROM of the printer.

After the processing above, normalization is executed using equation 2:

$$S_{LUT} = \frac{(S_i - \min(S))}{(\max(S) - \min(S))}(L^*_{maxr} - L^*_{minr}) + L^*_{minr}$$

Here, min(S) is the minimum value of the 1D LUT, and max(S) is the maximum value of the 1D LUT L*$_{max,r}$ is the maximum lightness value and L*$_{min,r}$ is the minimum lightness value, which is outputted by a printer. In this way, the optimal variable is determined by the range of relative outputted lightness when inputting and outputting, and it may provide optimal lightness/contrast and detail rendering.

Figure 4:
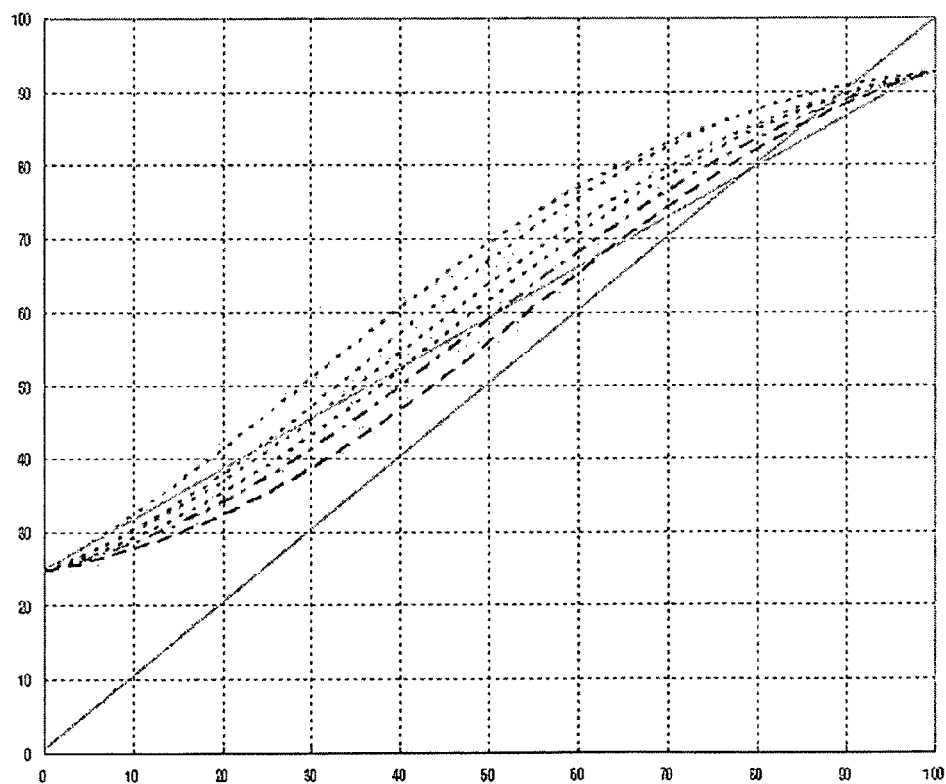
FIG. 4 illustrates six S-type decision functions.

FIG. 4 shows six different S-shaped functions. The average and standard deviation (x0, $\Sigma$) is: (30.0, 37.0), (38.75, 31.2), (42.0, 35.0), (46.0, 33.5), (50.0, 34.0), (55.0, 33.0). According to the visual sensitivity of a user, one sigmoid function may be selected it is possible to select illustrated in FIG. 4. A set of factors are used for selecting an S-shaped function.

Figure 5:
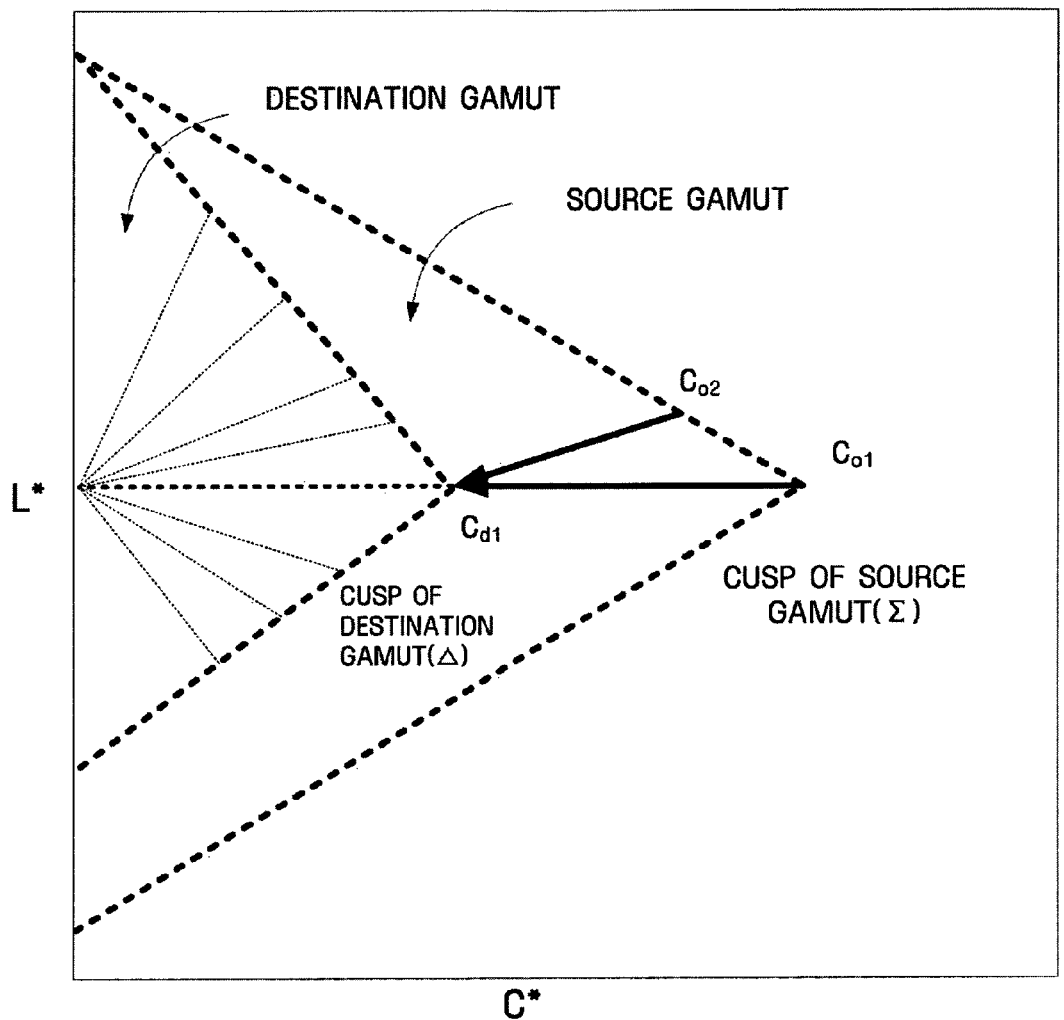
FIG. 5 illustrates the mapping of the gamut of an input device and that of an output device according to an embodiment of the present invention.

FIG. 5 is an illustration showing a gamut of input device and mapping of a gamut of an output device.

Maximizing the first solid color as cyan, magenta and yellow and the second solid color as red, green and blue from color preferences of a printer (for example, saturation 100%) and outputting the details of complex image is contradictory to the aspect of color mapping. In the case where the solid color is outputted, details have a strong probability of clumping the color.

A cusp color of an input color gamut (Co1) must be converted to a cusp color of an output color gamut (Cd1) in order to output the solid color. FIG. 5 shows calculation of the shortest Euclidean distance. Here, there is an advantage in outputting the solid color, but allows mapping of two input colors (Co1, Co2) to one point (Cd1). As a result of the outputting the clumped color, details are lost.

Accordingly, there is a demand for a method for enabling lightness/contrast adjustment that considers the output of color characteristics of various input and output devices, and input images, and the visual sensitivity of humans.

$$\vec{d}_m = \vec{d}_A + \vec{d}_I \quad \text{Equation 3}$$

In the event of outputting one source color, two different directions can be presumed. In equation 3, $d_A$ increases the purity of the solid color and $d_I$ maintains the first L* in order to improve detail rendering. The variable $d_m$, which combines two directions, may be set for mapping.

Figure 6:
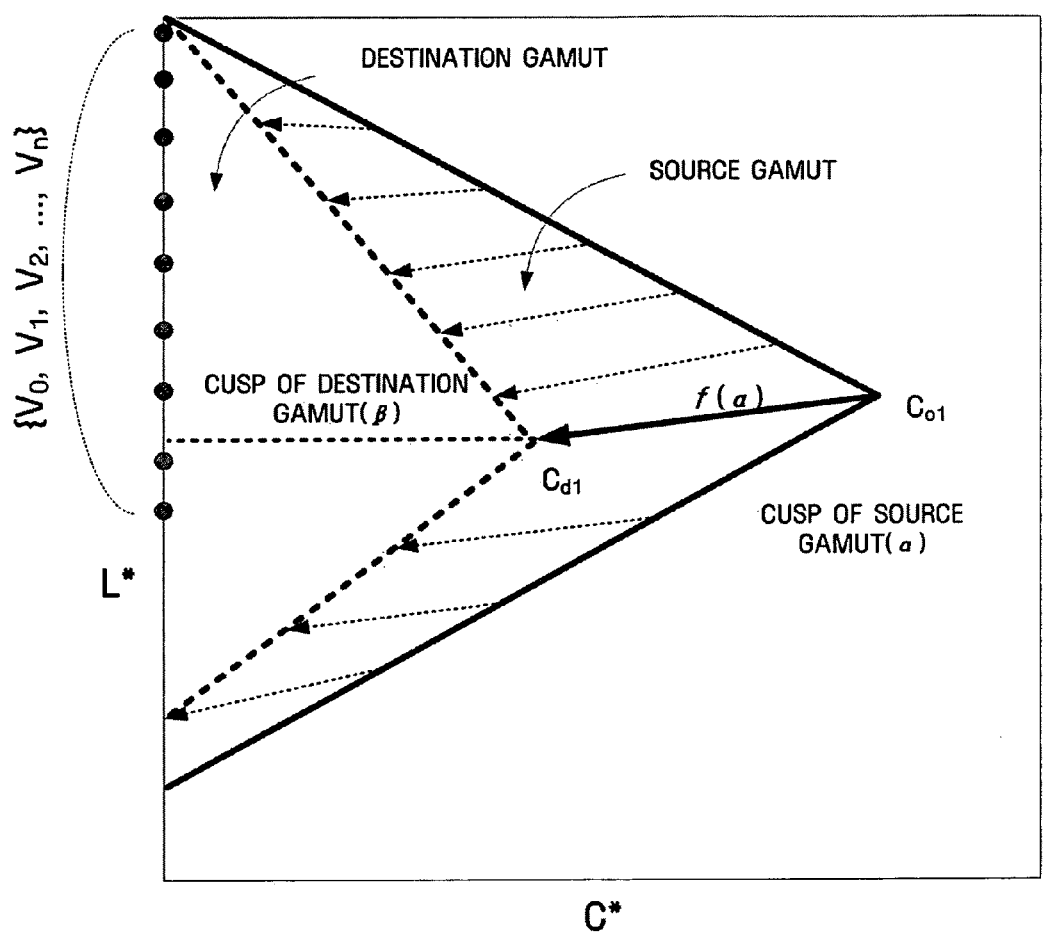
FIG. 6 illustrates the mapping of lightness/chroma according to an embodiment of the present invention.

FIG. 6 illustrates the mapping of lightness/chroma according to an embodiment of the present invention.

Here the function v(L*), which defines v0, v1, ..., vn (variable convergent points) is optimized. When colors of the source gamut are mapped to the destination gamut, each direction is defined not to overlap others. When defining the variable convergent points, they can be divided into points higher point than the cusp of the source gamut and points lower than the cusp of source gamut, thereby offering a determination function.

Figure 7A:
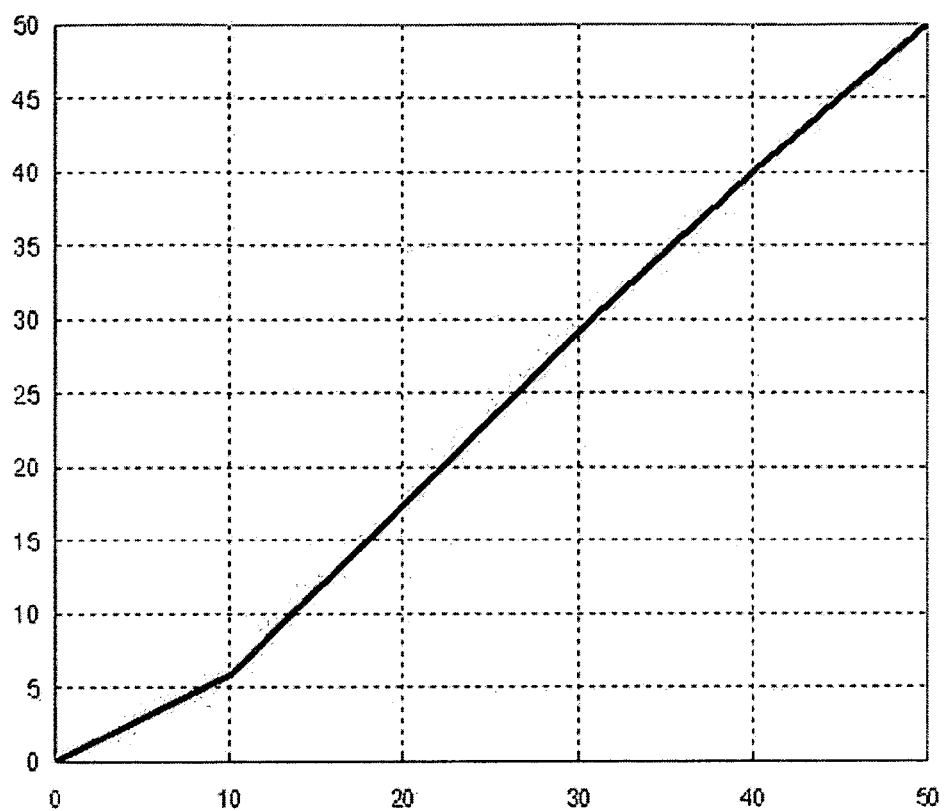
FIGS. 7A and 7B are graphs of decision functions of Vupper and Vunder based on a cusp of input a gamut used to obtain the decision function V(L*)
Figure 7B:
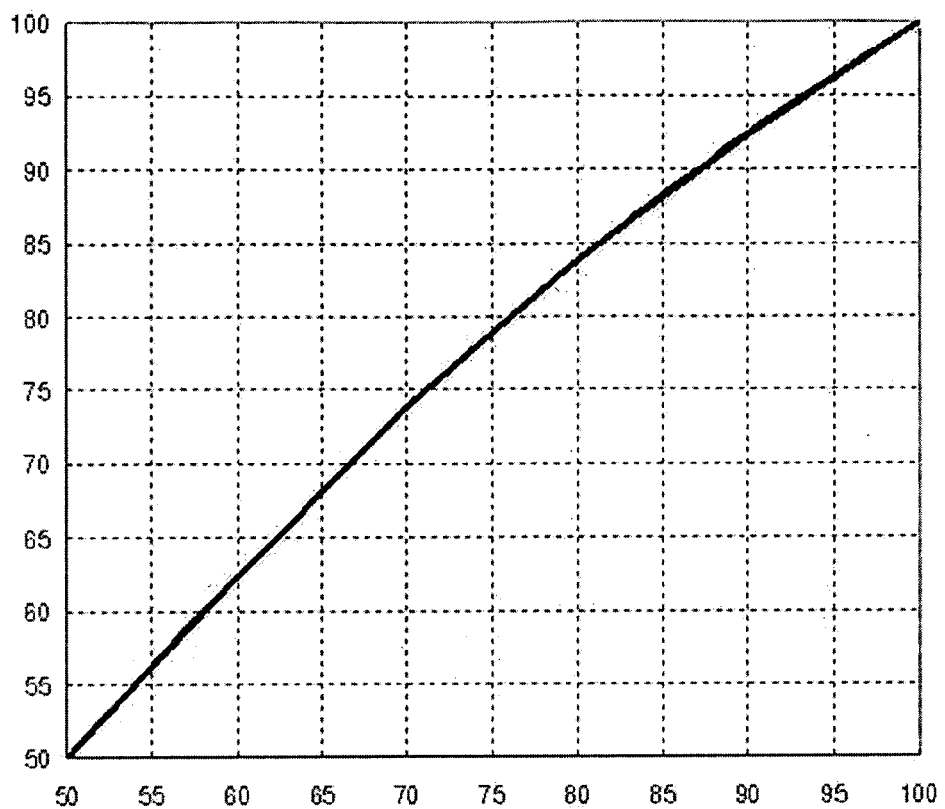

FIG. 7A and FIG. 7B show a graph of determination function upper point and lower point on the basis of the source gamut for calculating the determination function V(L*).

FIG. 7A is a function mapping a source gamut and a destination gamut, which is lower than the cusp of the source gamut. Equation 4 is used for calculating a variable convergent point $v_{under}$. FIG. 7B is a function mapping the source gamut and the destination gamut, which is higher than cusp of source gamut. Equation 5 is used for calculating the variable convergent point $v_{upper}$.

$$v_{under} = L_c^* \left( 1.0 - \left( \frac{L_c^* - L_{d\_min}^*}{L_{d\_cusp}^* - L_{d\_min}^*} \right)^n \right) \quad \text{Equation 4}$$

$$v_{upper} = \sin\left( \frac{L_c^* - L_{d\_min}^*}{L_{d\_cusp}^* - L_{d\_min}^*} \right) + L_c^* k \quad \text{Equation 5}$$

Here, $L_c^*$ is the color lightness of the first input. $L_{d\_min}^*$ is the minimum lightness of the printer, and $L_{d\_cusp}^*$ is the lightness of cusp of the printer gamut. The variable n is used for calculating the variable convergent point of lower space of the cusp, and the variable k is used for determining the variable convergent point of the higher space of the cusp. $V_{under}$ and $V_{upper}$ are variable convergent points.

The determining variables n and k are necessary for calculating the respective variable convergent points, convergent determining function's shape vary n, k adaptively or variably to the color reproducing/outputting characters of input device. They are determined by a look up table of a first dimension (1-D LUT), or by linear interpolation. Table 3 and Table 4 are look-up tables that provide information for selecting n and k.

TABLE 3

Mappings to Determine n

| ε | n |
|---|---|
| <5.0 | 2 |
| 5.0 | 2 |
| 15.0 | 3 |
| 25.0 | 4 |
| >25.0 | 3 |

TABLE 4

Mappings to Determine k

| ε | k |
|---|---|
| <5.0 | 1 |
| 5.0 | 1 |
| 15.0 | 2 |
| 25.0 | 3 |
| >25.0 | 3 |

Table 3 and 4 are LUT(look up table) which generates information necessary for selecting determination parameter n, k, and n, k are necessary parameter for calculating variable convergent point. As shown in equation 6, ε is calculated using cusp lightness (L*i_cusp) and cusp chroma (C*i_cusp) of input device, and cusp lightness (L*d_cusp) and cusp chroma (C*d_cusp) of printer. This process is calculating ε by difference of input device's gamut and printer device's gamut.

As shown by equation 6, ε is the difference between the gamut of an input device and the gamut of a printer.

$$\varepsilon = \sqrt{(L_{i\_cusp}^* - L_{d\_cusp}^*)^2 + (C_{i\_cusp}^* - C_{d\_cusp}^*)^2} \quad \text{Equation 6}$$

A method outputting a solid color by mapping the cusp α of source gamut to the cusp β of printer gamut uses equation 7 and the 1-D LUT of Table 5. When the distance between α and β is great, the solid color is outputted adaptively by increasing the weight ($w_c$) on chroma.

TABLE 5

Mappings to Determine $w_c$

| ε | $w_c$ |
|---|---|
| <10.0 | 2 |
| 10.0 | 2 |
| 15.0 | 3 |
| 20.0 | 4 |
| >20.0 | 4 |

$$d = \sqrt{\frac{(C_\alpha^* - C_\beta^*)^2}{\varpi_c} + (L_\alpha^* - L_\beta^*)} \quad \text{Equation 7}$$

Figure 8:
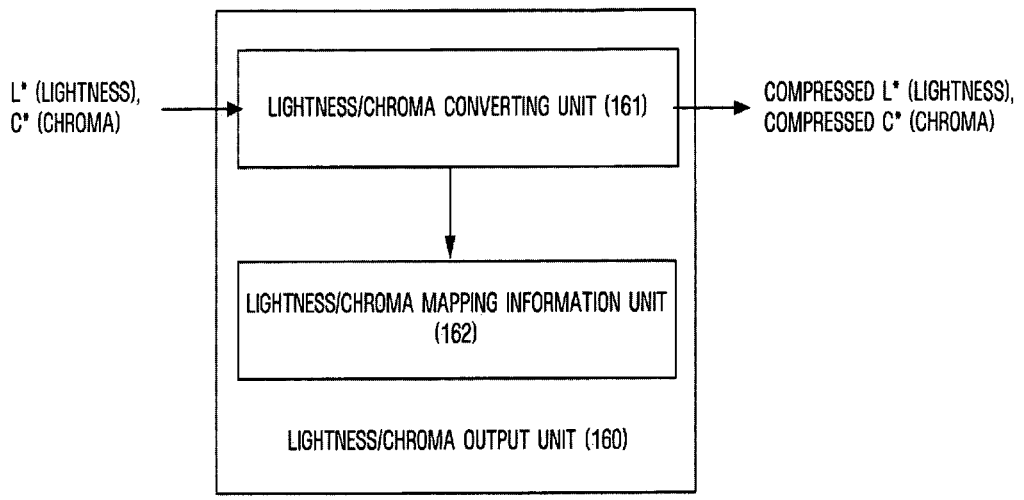
FIG. 8 illustrates the configuration of a lightness/chroma output unit according to an embodiment of the present invention.

FIG. 8 illustrates the lightness/chroma output unit according to an embodiment of the present invention. The lightness/chroma output unit 160 includes a lightness/chroma conversion unit 161 and a lightness/chroma mapping unit 162. The lightness/chroma conversion unit 161 converts the lightness and chroma by configuring the gamut of an input device or input image with reference to information that is stored in a lightness/chroma mapping unit 162. The lightness/chroma mapping unit 162 provides information such as Tables 3, 4, and 5, and selects a value for changing the source gamut into the printer gamut.

The term "unit", as used herein, means, but is not limited to, a software or hardware component, such as a field programmable gate array (FPGA) or an application specific integrated circuit (ASIC), which performs certain tasks. A module may advantageously be configured to reside in the addressable storage medium and to execute on one or more processors. Thus, a module may include, by way of example, components, such as software components, object-oriented software components, class components and task components, process, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Figure 9:
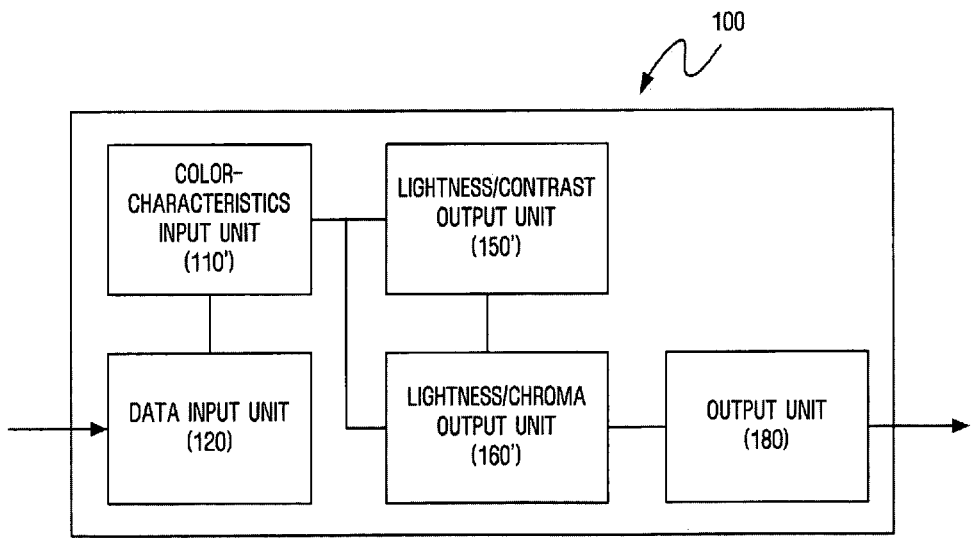
FIG. 9 illustrates the configuration of a printer according to an embodiment of the present invention.

FIG. 9 illustrates the configuration of a printer according to an embodiment of the present invention. In the printer, the color-characteristics input unit 110', lightness/contrast output unit 150', and lightness/chroma output unit 160' are identical to those of FIG. 1. A data input unit 120 receives image information from an image device (an input device) such as a digital camera, or a high-definition television (HDTV). The image information may include color characteristics. A data input unit 120 may receive only the color characteristics separately from a connected image device (an input device), and provide it to a color-characteristics input unit 110'. As described above, the color-characteristics input unit 110' receives color characteristics of an input device or an image, thereby providing the information to the lightness/contrast output unit 150' and the lightness/chroma output unit 160'.

As described above, the lightness/contrast output unit 150' and the lightness/chroma output unit 160 convert original color characteristics into a proper space for a printer.

An output unit 180 outputs a converted image through the lightness/chroma output unit 160.

Accordingly, embodiments of the present invention provide optimized color for a printer using predefined data, and an input device or color characteristics of image as parameters. Hue differentiation is improved by preventing the mapping of two different colors to one color.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of outputting an optimally converted image using color characteristics of an input image or an input device, the method comprising:

receiving the color characteristics that include a maximum lightness and a minimum lightness that can be output by the input device or a maximum lightness and a minimum lightness of a pixel of the input image;

converting a range of lightness in the received color characteristics into converted color characteristics including a range of lightness that can be represented by a printer;

converting a gamut of the converted color characteristics including the converted range of lightness that can be represented by the printer into a converted gamut which includes a range of lightness and chroma that can be represented by the printer; and adaptively outputting the input image as an optimally converted image according to the converted gamut of the received color characteristics.

2. The method of claim 1, wherein the color characteristics are stored in a storage device.

3. The method of claim 1, wherein the color characteristics are stored in an image header of the input image or are transmitted by the input device.

4. The method of claim 1, wherein converting the range of lightness in the received color characteristics includes mapping a range of lightness represented by the received color characteristics into the range of lightness that can be represented by the printer using an S-shaped function.

5. The method of claim 4, wherein an average and a standard deviation of the S-shaped function are extracted from a look-up table including the color characteristics.

6. The method of claim 1, wherein converting the gamut of the converted color characteristics includes converting the gamut of the converted color characteristics into a gamut that can be represented by the printer by using a determination function to calculate a variable convergent point of the converted gamut.

7. An apparatus comprising:

an information input unit which receives color characteristics of an input image or an input device, wherein the color characteristics include a maximum lightness and a minimum lightness that can be output by the input device or a maximum lightness and a minimum lightness that exist in a pixel of the input image;

a lightness/contrast output unit which converts a range of lightness in the received color characteristics into converted color characteristics including a range of lightness that can be represented by a printer;

a lightness/chroma output unit which converts a gamut of the converted color characteristics that include the converted range of lightness that can be represented by the printer into a gamut which includes a range of lightnesses and chroma that can be represented by the printer; and an output unit which outputs the input image as an optimally converted image according to the converted gamut of the received color characteristics from the lightness/chroma output unit.

8. The apparatus of claim 7, wherein the color characteristics are stored in a storage device.

9. The apparatus of claim 7, wherein the color characteristics are stored in an image header of the input image or are transmitted by the input device.

10. The apparatus of claim 7, wherein the lightness/contrast output unit converts the range of lightness in the received color characteristics into the range of lightness that can be represented by the printer using an S-shaped function.

11. The apparatus of claim 10, wherein an average and a standard deviation of the S-shaped function are extracted from a look-up table including the color characteristics.

12. The apparatus of claim 7, wherein the lightness/chroma output unit converts the gamut of the converted color characteristics into a gamut that can be represented by the printer by using a determination function to calculate a variable convergent point of the converted gamut.

13. A computer readable recording medium storing a program for causing a computer to execute a method of outputting an optimally converted image using color characteristics of an input image or an input device, the method comprising:

receiving the color characteristics that include a maximum lightness and a minimum lightness that can be output by the input device or a maximum lightness and a minimum lightness of a pixel of the input image;

converting a range of lightness in the received color characteristics into converted color characteristics including a range of lightness that can be represented by a printer;

converting a gamut of the converted color characteristics that includes the range of lightness that can be represented by the printer into a converted gamut of lightness and chroma; and adaptively outputting the input image as an optimally converted image according to the converted gamut.

* * * * *